UNITED STATES PATENT OFFICE.

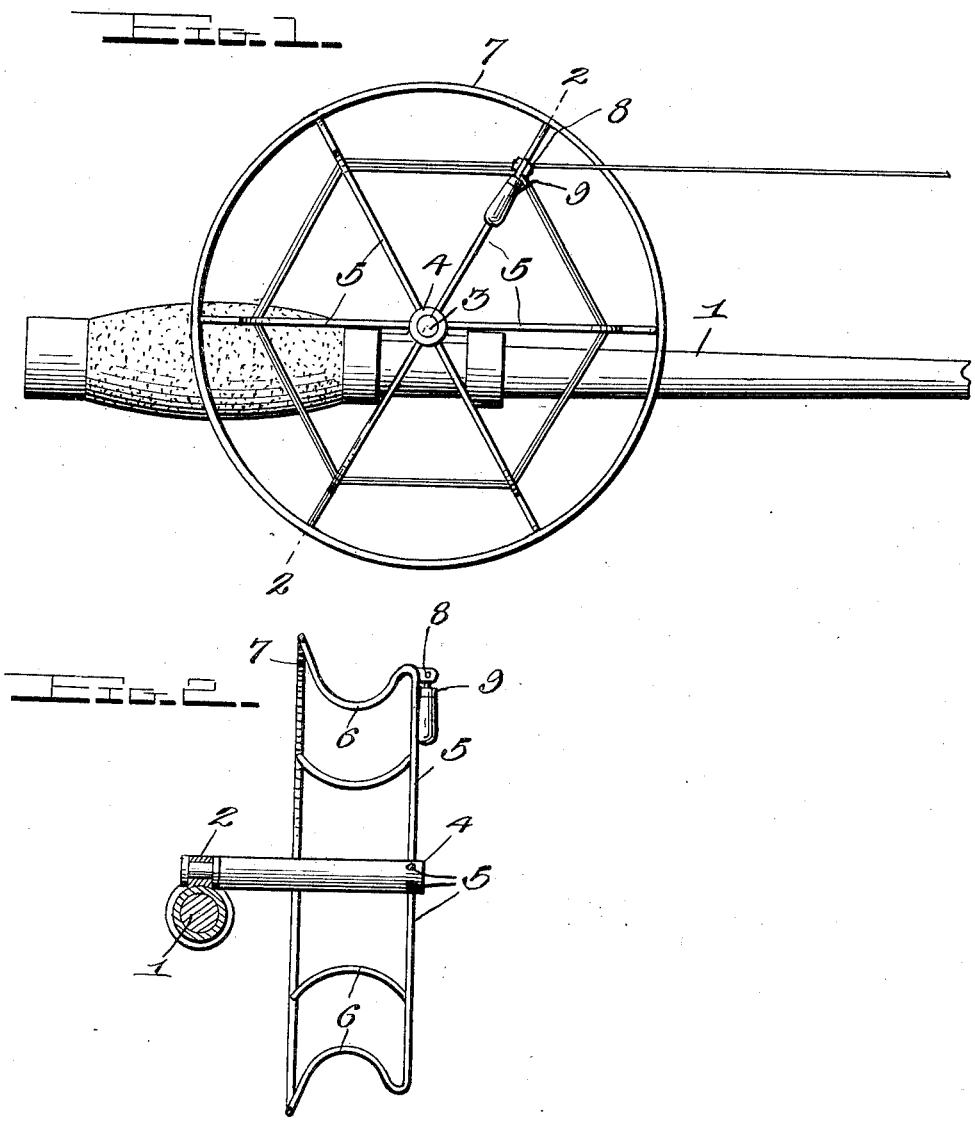

MATHIAS FITCH, OF HUNTERTOWN, INDIANA.

LINE-REEL.

1,067,329.  Specification of Letters Patent.  Patented July 15, 1913.

Application filed October 23, 1912. Serial No. 727,424.

*To all whom it may concern:*

Be it known that I, MATHIAS FITCH, a citizen of the United States, residing at Huntertown, in the county of Allen and State of Indiana, have invented certain new and useful Improvements in Line-Reels, of which the following is a specification, reference being had to the accompanying drawings.

This invention relates to new and useful improvements in line reels and more particularly to fish line reels.

The object of the invention is to provide a reel adapted to be detachably mounted upon a fish pole to receive the fishing line for the purpose of drying the same after using.

Another object of the invention is to provide a device of this character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claims and shown in the accompanying drawings in which, Figure 1 is a side elevation of a fish pole showing my improved reel applied thereto. Fig. 2 is a sectional view taken on the line 2—2 of Fig. 1.

Referring more particularly to the drawings, 1 indicates a fish pole which may be of any suitable type and upon which is mounted a bearing 2 arranged adjacent the inner end of the butt of the pole. Mounted in this bearing is one end of the shaft 3 which extends transversely with respect to the pole and upon the outer end of which is mounted a head 4. Having their ends mounted in the head 4 and projecting radially therefrom are the arms 5, the outer ends of which are bent to form the transversely extending bowed portions 6, while the extreme ends of the arms are soldered or otherwise secured to an annulus 7.

Pivotally secured to the outer end of one of the arms at the bent portion thereof, as shown at 8, is a handle member 9 which is adapted to be grasped by the hand to rotate the reel. Thus it will be apparent that a line may be quickly and easily wound upon the reel, the same being disposed upon the bowed portions 6. From the above it will be apparent that the fishing line can be quickly and easily wound upon the reel without entangling the same. It will also be apparent that the reel may be quickly and easily detached from the pole or applied thereto.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. In a device of the character described, the combination of a shaft, a hub mounted thereon, a plurality of radially projecting arms mounted in the outer end of said hub, the outer ends of said arms being bent to form transversely extending bowed portions, which are circularly arranged around the hub, an annulus arranged in spaced relation to the hub and secured to the extreme ends of said arms whereby the bowed portions of said arms are supported in position, and a handle member pivotally secured to one of said arms whereby the reel may be rotated.

2. In combination with a fishing pole having a bearing detachably mounted upon the pole adjacent the butt end thereof, of a hub having its inner end mounted in said bearing and extending transversely with respect to the pole, a plurality of radially projecting arms mounted in the outer end of said hub, the outer ends of said arms being bent to form transversely extending bowed portions, which are circularly arranged around the hub, an annulus arranged in spaced relation with the hub and secured to the extreme ends of said arms whereby the bowed portions of said arms are supported in position, and a handle member pivotally secured to one of said arms whereby the reel may be rotated.

In testimony whereof I hereunto affix my signature in the presence of two witnesses.

MATHIAS FITCH.

Witnesses:
R. LEARMONTT, Jr.,
VIRGIL ROY.